United States Patent [19]
Jacques

[11] Patent Number: 5,612,839
[45] Date of Patent: Mar. 18, 1997

[54] CONTACT RECORDING SLIDER WITH ACTIVE CONTACT SURFACES

[75] Inventor: Alan M. Jacques, San Diego, Calif.

[73] Assignee: Sunward Technologies, Inc., San Diego, Calif.

[21] Appl. No.: 619,279

[22] Filed: Mar. 18, 1996

Related U.S. Application Data

[63] Continuation of Ser. No. 276,960, Jul. 18, 1994, abandoned.

[51] Int. Cl.$^6$ .................................................... G11B 15/64
[52] U.S. Cl. ........................................................ 360/103
[58] Field of Search ............................................... 360/103

[56] References Cited

U.S. PATENT DOCUMENTS

| | | | |
|---|---|---|---|
| 4,191,980 | 3/1980 | King et al. ............... | 360/103 X |
| 4,475,135 | 10/1984 | Warner et al. ............ | 360/103 |
| 4,734,803 | 3/1988 | Nishihira .................. | 360/103 |
| 4,901,185 | 2/1990 | Kubo et al. ............... | 360/104 |
| 4,939,603 | 7/1990 | Inumochi .................. | 360/103 |
| 5,212,608 | 5/1993 | Yoneoka ................... | 360/103 |
| 5,287,235 | 2/1994 | Cunningham et al. ... | 360/103 |
| 5,305,165 | 4/1994 | Brezoczky et al. ...... | 360/103 |
| 5,323,283 | 6/1994 | Sano ......................... | 360/103 |
| 5,383,073 | 1/1995 | Masukawa et al. ...... | 360/103 X |
| 5,386,400 | 1/1995 | Nakayama et al. ...... | 360/103 X |

FOREIGN PATENT DOCUMENTS

| | | | |
|---|---|---|---|
| 0576723 | 1/1994 | European Pat. Off. ............... | 360/103 |
| 1-105367 | 4/1989 | Japan. | |
| 1158608 | 6/1989 | Japan ..................................... | 360/103 |

*Primary Examiner*—John H. Wolff
*Attorney, Agent, or Firm*—Fish & Richardson, P.C.

[57] ABSTRACT

A method and apparatus for transferring information to and from a rigid magnetic disk medium through a recording mechanism mounted within a magnetic contact slider. The slider is fashioned such that the trailing edge maintains contact with the magnetic recording medium while the leading edge of the slider is disposed slightly above the medium on an air bearing. An active contact surface (ACS) utilizes a contact blend such that the width of the ABS near a leading edge is greater than the width of the ABS near a trailing edge. The ACS contour allows air to bleed off air from the rear of the slider and causes the trailing edge of the slider to remain essentially in contact with the rigid recording medium surface. The ACS contour also provide a "transverse-free zone" for minizing asperity damage and other harmful effects of transverse air flow. The load point is located near the leading edge of the contact slider. Thus, damage to the medium which occurs during each stick/slip phase of lift off is minimized. The ACS is formed by asperity inlet angles blended to reduce the inertia forces exerted by the slider on asperities by providing a greater distance for an asperity with a transverse velocity component to travel as the asperity moves under the air bearing sruface and the ACS.

8 Claims, 23 Drawing Sheets

INVENTION $X_F$   5–49% L $X_{CP}$   5–49% L $\dfrac{X_F}{X_{CP}}$   1.05–1.20

$\gamma_{EH}$   .003–.006 DEG.

CONTACT RECORDING SLIDER WITH ACTIVE CONTACT SURFACES

This is a continuation of application Ser. No. 08/276,960, filed Jul. 18, 1994, now abandoned.

BACKGROUND OF THE INVENTION

1. Field of the Invention

This invention relates to a method and apparatus for transferring data to and from a magnetic medium, and more particularly to a contact recording slider and a method for operating the contact slider in contact with a magnetic medium with a minimal impact on the magnetic medium and the slider.

2. Description of Related Art

Magnetic recording systems utilizing transducers that are supported by an air bearing layer as the transducers move relative to the surface of a rigid magnetic recording disk are well known in the art. Typically, each transducer is mounted in a slider assembly which has a contoured surface. The air bearing is produced by pressurization of the air as it flows between the disk and the slider, and is a consequence of the slider contour and relative motion of the two surfaces. The purpose of the air bearing slider is to provide a very narrow clearance, preferably with no contact between the slider and the rotating disk. The resulting air bearing prevents or reduces damage that would be caused by the slider coming into contact with the rigid medium during operation. Accordingly, transducers "fly" on a layer of pressurized air at several micro-inches above a rotating disk surface. The closer the transducers fly to the rotating disk surface, the greater the density of magnetic flux changes which can be imposed on the recording medium (i.e., the greater the density of data which can be stored on the rotating disk). While lower flying heights produce greater recording densities, an effective air bearing limits the proximity of the slider to the rigid medium to minimize damage.

Typical sliders of the prior art, as illustrated in FIG. 1, utilize at least two lower rails 1a, 1b having flat surfaces 2 oriented toward the recording medium and extending from the body 5 of the slider. Each of these rails 1a, 1b has a tapered forward surface 3a, 3b oriented against the direction of rotation 4 of the recording medium. The rotating recording medium forces air by viscous effect into the tapered forward surfaces 3a, 3b, and thereby produces a pressure beneath each of the rails 1a, 1b, resulting in the air bearing. Typically, these sliders are gimbal-mounted to a load beam assembly which is attached to an arm at a point defined as the "load point" of the slider. The arm is driven by an actuator which positions the transducer over the recording surface from one data track to another. The arm can move in a linear motion (which is termed linear axis), or it can rotate about a pivot point (which is termed rotary axis). With rotary axis, the slider will be positioned at varying angles with respect to direction of the rotation of the disk as the slider moves over the recording surface in an arc. This angular orientation is referred to as the "skew" angle.

Another example of a magnetic head air bearing slider is provided in U.S. Pat. No. 4,475,135 issued to Warner, et al. (the '135 patent). FIG. 2a is an illustration of a slider in accordance with the '135 patent. The '135 patent discloses a self-loading magnetic head air bearing slider 30 having a tapered leading edge 10. The tapered leading edge 10 in accordance with the '135 patent is provided along the entire leading edge 12 of the slider 30. Two rails 28, 30 have parallel sections 32, 34 up to a "break point", and then have flared sections 36, 38 extending toward the trailing edge 26. The rails 28, 30 are flared to provide a negative pressure region, and thus an improved pressure profile and thereby allow fast lift-off from a disk surface by allowing the load on the slider to be slight at takeoff and to increase as the slider achieves flight speed. The slider of the '135 patent attempts to maintain a substantially constant flying height over all the data tracks on a disk surface. FIGS. 2 and 3 illustrate structures having negative pressure regions.

Other examples of a self-loading slider 40 having a negative pressure region 52 intended to provide an improved the pressure profile are disclosed in U.S. Pat. No. 5,212,608 issued to Yoneoka (the '608 patent) and illustrated in FIG. 2b and U.S. Pat. No. 4,734,803 issued to Nishihira and illustrated in FIG. 2c. A slider 40 as shown in FIG. 2b has two rails 51, 51' which extend from a body 59. The width of each rail 51, 51' is greater near the leading edge, and narrower near the trailing edge. Narrowing the trailing edge of the rails 51, 51' provides the negative pressure region 52 when air enter in the direction shown by arrow 55. Thus, the height at which a recording element 53 flies over a recording medium is stablized. A slider 40' as shown in FIG. 2c has leading edge tapers 66, 66' to aid in generating an air bearing, and rails 60, 60' which produce a negative pressure region 68. These designs provide a flow path in which the area available for air to exit the air bearing is greater than the inlet area. This expansion in flow path area causes an expansion of the air resulting in lower pressure. This lower pressure can be a negative "gage" pressure, or an absolute pressure which is less than the ambient pressure. This negative gage pressure produces a suction force on portions of the slider to provide a downward self-loading force on the slider body. In typical negative pressure structures, air expands into the recess between the air bearing surface rails to create the negative pressure region. The inner edge of each rail forms the recess or negative pressure region.

While lower flying height of a slider produces greater recording densities (i.e., allow more flux changes per inch), an effective air bearing limits the proximity of the slider to the medium. Ultimately, it would be desireable for a slider to be in contact with the medium to acheive the greatest recording density. Such contact is established between a recording head and the magnetic medium of data storage devices which use flexible recording media. For example, U.S. Pat. No. 4,191,980 issued to King et al. (the '980 patent) discloses a transducer with tapered edge profiles for transferring data to and from a flexible magnetic disk. However, it is well known that placing a recording slider in contact with a rigid recording medium damages both the recording medium and the slider and thus reduces the life of the data storage device.

Furthermore, conventional sliders suffer from the following disadvantages: (1) Asperity contact, (2) Stiction, and (3) Transverse flow.

Asperity contact—Although air bearing sliders fly on an air bearing as described above, they nonetheless contact the medium during take-off and also contact asperities or contamination during steady flight. These asperities (i.e., protrusions and protuberances which rise above the magnetic disk surface) are higher than the flying height of the slider and contact the air bearing slider rails causing damage to either the recording medium or the slider rail. Furthermore, such sliders typically have a load point (i.e., the point at which a downward force is applied to the slider to prevent the slider from flying at too great a height over the magnetic disk surface) which is generally located on the air bearing slider at a point which is closer to the trailing edge than the leading edge of the slider. The slider typically gimbals about the load point. Damage may occur if the slider pitches down and "plows" into the disk surface. That is, if the leading edge of the slider makes contact with the disk surface due to a forward pitching motion during flight. Even in instances when the slider does not pitch down, but rather contacts an asperity at the desired attitude, the contact may be damaging to the slider and medium. In the best circumstance, a slider makes contact with an asperity on the air bearing surface while pitched upward with the leading edge above the trailing edge. In such a case, the force that is generated by the impact may still exceed the yield limit of the material and cause plastic deformations or fracturing of the material. Once this type of damage begins, repeated contact of such a slider with asperities on the medium accelerates the break-up of the thin, hard coating on the disk surface and head crashes may ensue.

Stiction—Conventional sliders have a reliately high stiction between sliders and a magnetic medium. Plots of stiction over thousands of "contact stop start" (CSS) cycles show a pronounced increase in the stiction value of conventional designs with age. FIG. 3 shows such CSS data for a slider representative of the current art. The increase in stiction corresponds to a degradation of the medium surface. Damage is caused as the slider shears or fractures asperities before flight is achieved. Higher stiction values result in higher lift-off torque values, which, because the load point is above the medium surface, causes the slider to "nose down" before take-off. This nose down force produces a greater "plowing" of the media by the nose of the slider.

One mechanism which contributes to stiction is the amount of energy required to deform or shear asperities that constitute the real area of contact between the slider and the medium when the slider is not in flight. It is believed that this is due to shearing forces generated between the sides of the slider and the inner wall of a depression in the recording medium that is created when the slider is impressed slightly into the material of the recording medium. In order to pull the slider from the recess that is created by the force of the slider which is at rest against the recording medium, the slider must overcome the shearing forces that are generated by the edges of the slider grating against the edges of the recess. Still further, sharp edges of the air bearing surface produce stress concentrations in the medium. These stress concentrations increase the depth of sheared regions, causing severe damage. Also, these sharp edges act as a knife edge seal which prevents air from entering underneath the slider as disk motion is initiated. This sealing further inhibits the take-off of the slider and increases the contact between the medium and the air bearing surfaces as the medium starts to move with respect to the slider. This increased contact, together with other forces between the slider and the recording medium, causes damage to the medium and to the air bearing surfaces of the slider.

Transverse Flow—Transverse flow occurs when a conventional slider is oriented at non-zero skew angles or when a slider is moved radially across the medium. When conventional sliders are flown at a skew angle other than 0°, or when a conventional slider moves radially at a relatively high velocity, transverse flow occurs under the air bearing surfaces. Such transverse flow causes conventional sliders to roll and makes it difficult to maintain a constant flying height. In order to correct for the effects of such transverse flow, so-called "constant flying height" designs have been proposed. Although these have not demonstrated truly constant flying height over the operational range of skew angles, they do desensitive the slider's flying height to the skew angle. One such "constant flying height" design incorporates transverse pressure contour (TPCs). For example, in U.S. Pat. No. 4,673,996 ("the '996 patent"), a range of contours are disclosed. While these contours provide some improvement in the flight of a slider, fabricating the fairly precise angles or angular structures required to form the transverse pressurization contour on an air bearing edge is problematic.

Therefore, it would be desirable to provide a slider which is less susceptible to damage from transverse contact with asperities, which has fast lift-off from a disk surface, is less susceptible to transverse air flow, provides high recording density, reduces stiction of the slider to the disk surface, and is inexpensive and simple to fabricate. The present invention provides such a slider.

SUMMARY OF THE INVENTION

The present invention is a contact slider for transferring information to and from a magnetic disk medium through a recording mechanism mounted within an active contact surface (ACS). As the slider of the present invention operates each ACS is essentially in contact with a magnetic medium. Therefore, in accordance with the present invention, the notion of constant flying height is moot. The present invention is not intended to be an enhanced negative pressure slider, a constant flying height slider, or a modification of an existing slider with transverse pressure contour or negative pressure regions. Such conventional designs, with their various rail outside angles and rail inside edges which define a negative pressure recess region, attempt to provide two fundamental objectives: 1) more constant flying height across the range of skew angles; and 2) a lower external loading of the slider by the suspension due to the self-loading nature of the negative pressure region.

A slider in accordance with a first embodiment of the present invention is fashioned such that one or more rails are provided, each having an air bearing surface (ABS). A leading edge taper is provided at the leading edge of each ABS. The leading edge taper allows air to be swept under the ABS and thus lift the leading edge of the slider off the recording medium. An ACS, generally disposed at the trailing edge of each rail, maintains contact with the magnetic recording medium while the leading edge of the ABS is disposed slightly above the medium on an air bearing. In accordance with a first embodiment of the present invention, the forward or leading portion of the ACS is wider than the rear or trailing edge of the ACS, causing air to bleed off from the rear of the slider. Thus, the ACS remains essentially in contact with the recording medium surface. The ACS is preferably fashioned at an ACS slant angle, defined as the angle between the outside edge of an ACS and the longitudinal axis of the ACS. When the slider is at a skew angle which is less than ACS slant angle, minimal transverse air flow occurs across the ABS and the ACS. Therefore, since there is minimal transverse air flow component, the slider is essentially unaffected by skew angles which are less than the ACS slant angle. The fact that the present invention is operated essentially in contact with the rigid recording medium essentially eliminates the effects of skew angle even with an ACS slant angle of zero degrees.

In addition, in accordance with the present invention, the load point is located near the leading edge of the air bearing slider. However, the introduction of contact reaction forces on the ACS causes the load point to be behind the ABS center of pressure. The forces provided by the ACS and the ABS reduce forward pitching motion of the slider. Thus, the slider is less likely to "plow" into the recording medium. Furthermore, the ACS is formed by an effective asperity inlet angle to reduce the inertia forces exerted by the slider on asperities by providing a greater distance for an asperity to travel during transverse contact as the asperity moves under the ACS. The greater distance traveled by an asperity with respect to the slider also decreases the natural frequency of oscillation of the slider caused by transverse contact of the slider with the asperity.

In addition, the slant angle of the ACS lowers the force required to break the adhesion bonds which contribute to stiction. In accordance with the present invention, the slider yields the medium material slightly when at rest. This deformed region creates a depression. In this depression, there is suction forces and adhesive bonding forces between the slider and medium molecules. The ACS taper allows the slider to pull away from this deformation almost instantaneously as relative motion is initiated. Furthermore, the blended edges of the ACS allow air to flow more quickly under the ACS, thus providing more rapid lift-off. Thus, media damage is reduced. Furthermore, the reduced or eliminated ABS area toward the rear edge reduces the suction area. This lowers the pullout torque and consequently the medium damage.

Accordingly, this embodiment achieves at least these objectives:

a) Provides greater lifting force at the leading edge, and air bleed-out from under the trailing edge. Thus, the ABS leading edge rises and ACS remains in active contact with the medium. This results in higher than normal flying attitude.

b) Minimizes sliding friction (shearing of asperities along the slider edges of the ABS and ACS, and adhesion/suction effects) between start-up and lift-off from the medium.

c) Reduces the dynamic impact force imparted by the slider to the medium during "transition" flight (i.e., between initial lift-off and stable flight). In particular, the increased frontal ABS area in combination with a forward loading point reduces the tendency of the nose of the slider to plunge into the medium during the stick-slip interval (i.e., between the time the slider breaks free from static stiction and the time the media reaches the velocity required to fully developed an air bearing).

d) Introduces a transverse-free zone. The transverse-free zone is intended to ensure that no asperities contact the sides of the rails during operation within a predetermined range of non-zero skew angles. It is not the purpose of this zone to desensitize the slider's flying height to skew angle, since the fact that the ACS is in contact with the medium reduces the effects of skew angle.

A second embodiment of the present invention has an asperity inlet angle. This angle may also be blended to the slider edge surface and the ABS surface. This embodiment achieves at least the following objectives:

a) Lower forces exerted on the asperity due to the much longer lifting distance.

b) Lower frequency of transverse oscillation of the slider due to the longer lifting distance. This lowers the oscillation frequency out of a critical range.

c) Reduction in the stress concentration along the edge of the slider at rest.

d) Improved ability for air to enter under the slider more rapidly, especially at the rear end where the resisting torque is greatest.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

STRUCTURE OF ONE EMBODIMENT OF THE PRESENT INVENTION

Figure 1:
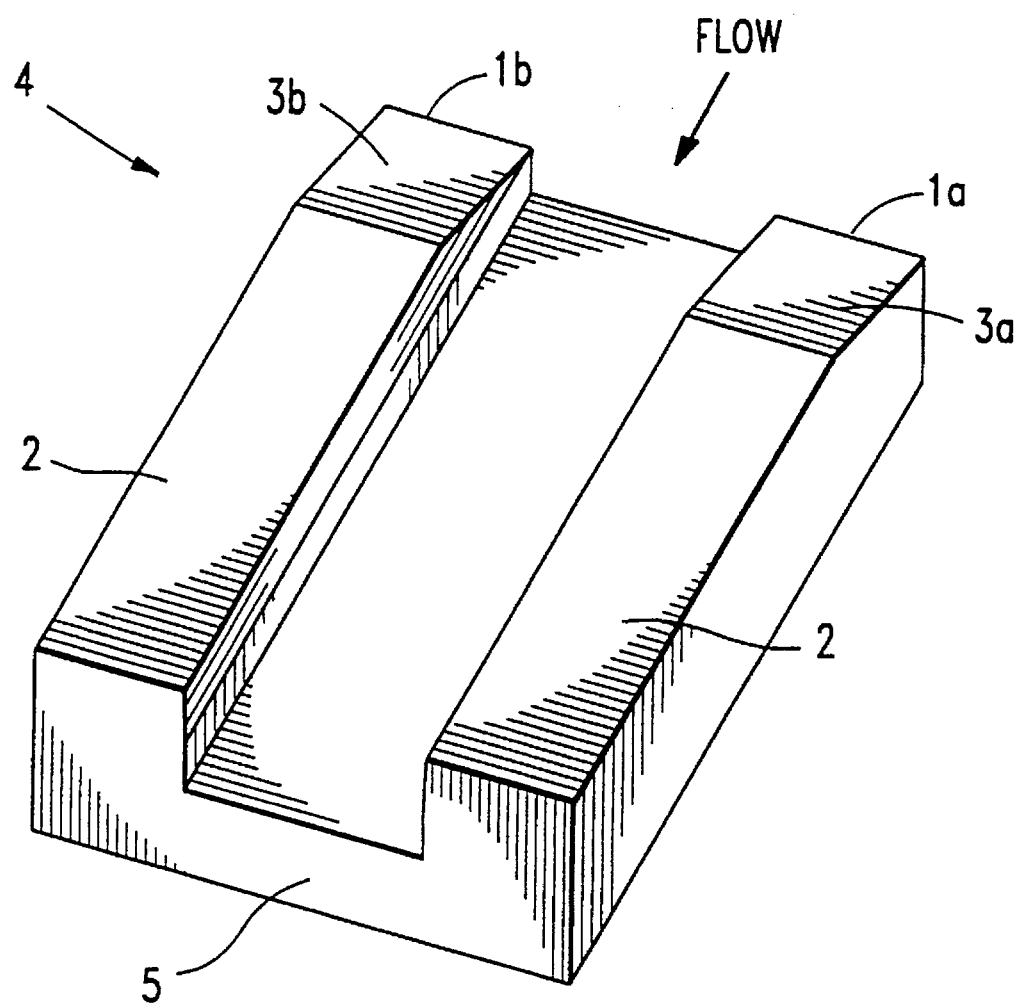
FIG. 1 is an illustration of a prior art slider.
Figure 2A:
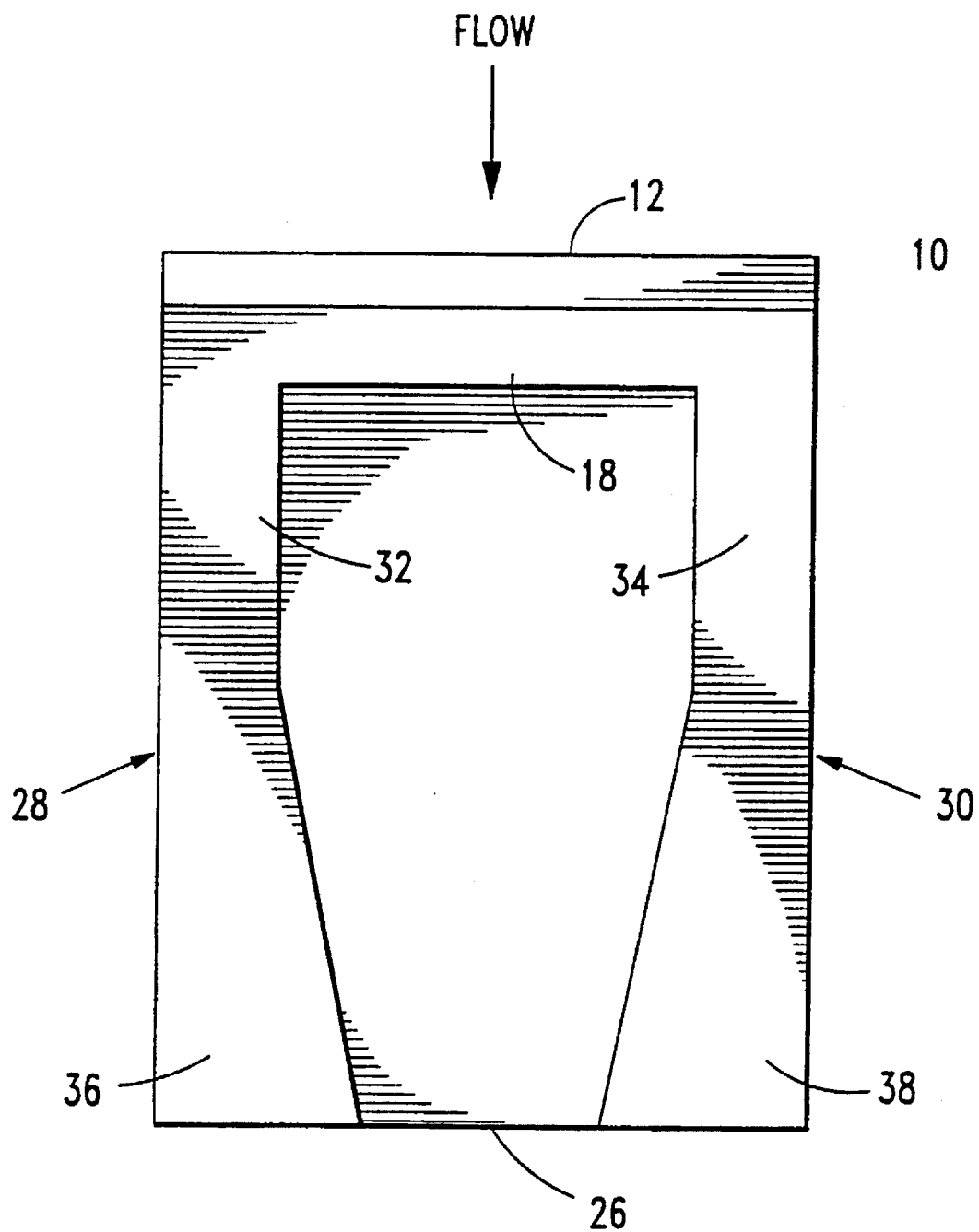
FIG. 2a is an illustration of a prior art slider with transverse pressurization contours.
Figure 2B:
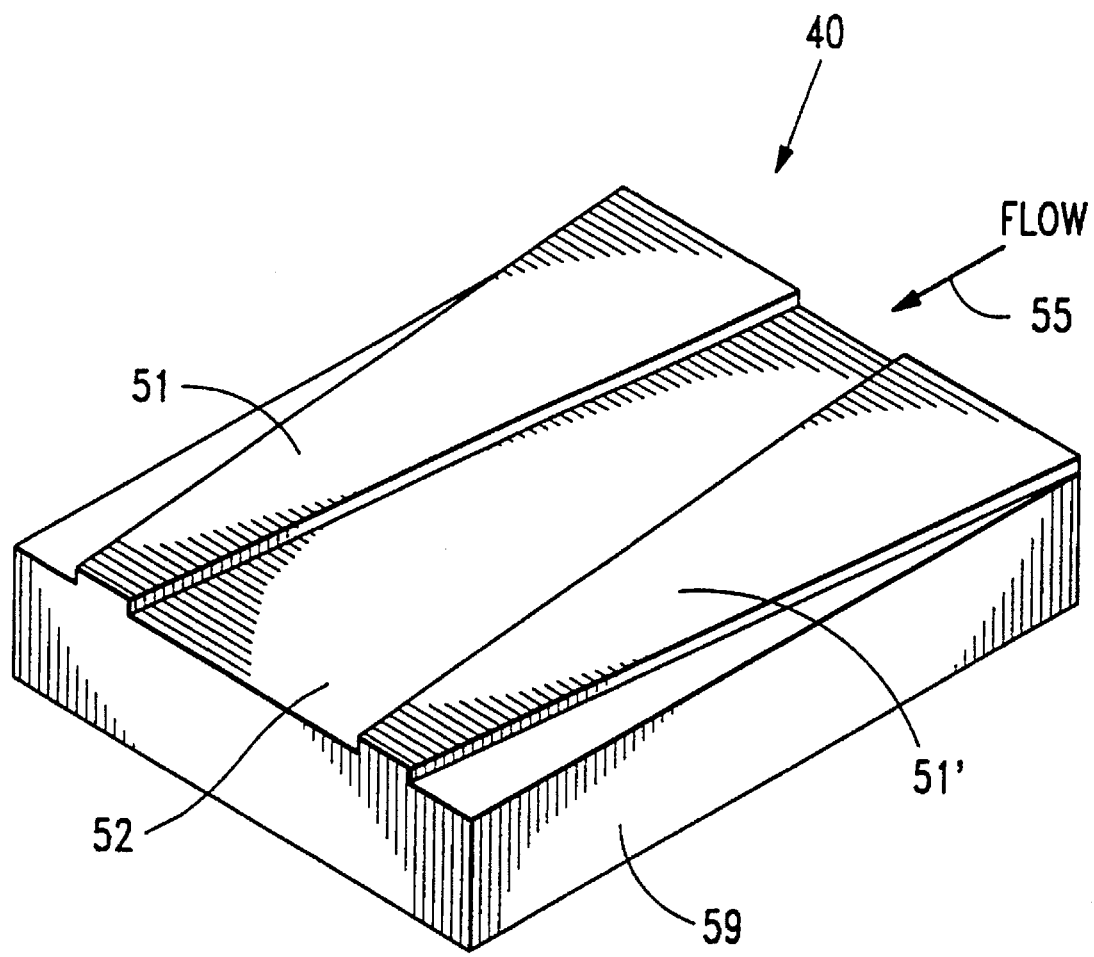
FIGS. 2b and 2c are illustrations of prior art self-loading sliders having a negative pressure region.
Figure 2C:
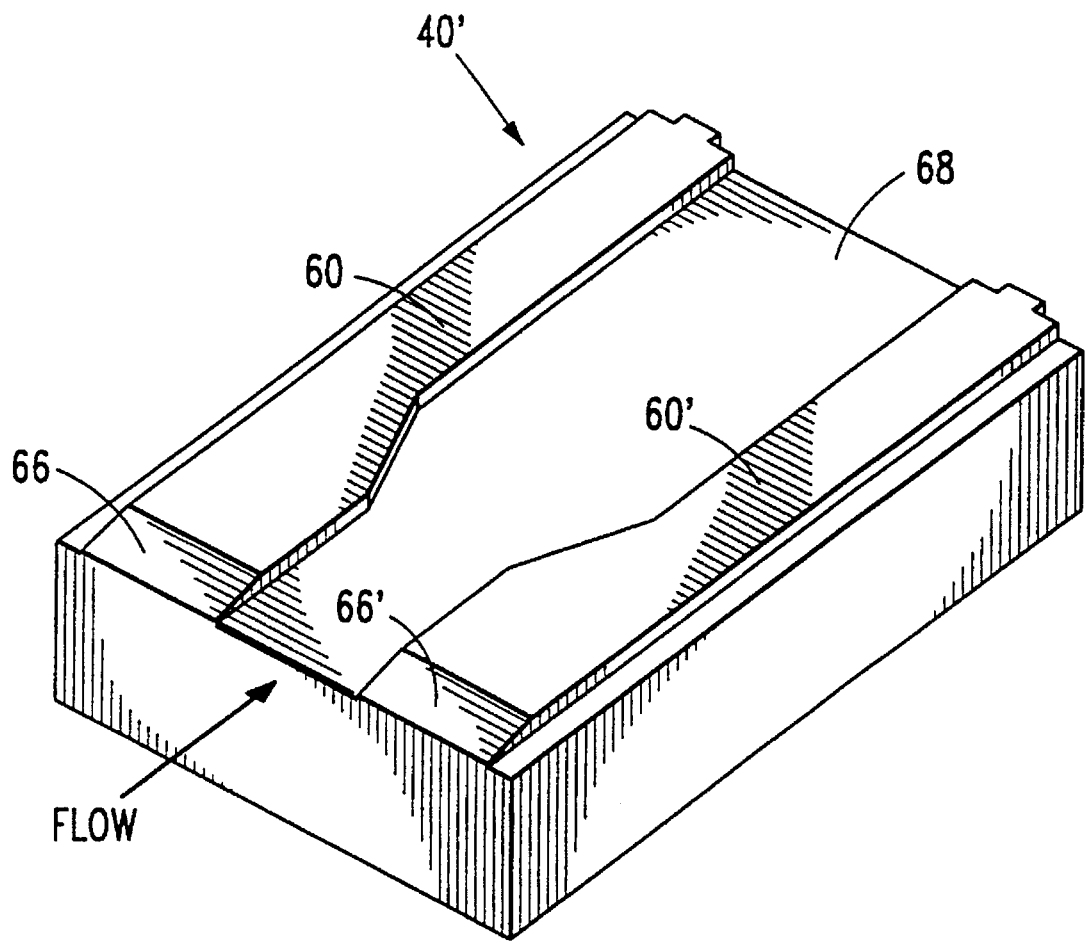
Figure 3:
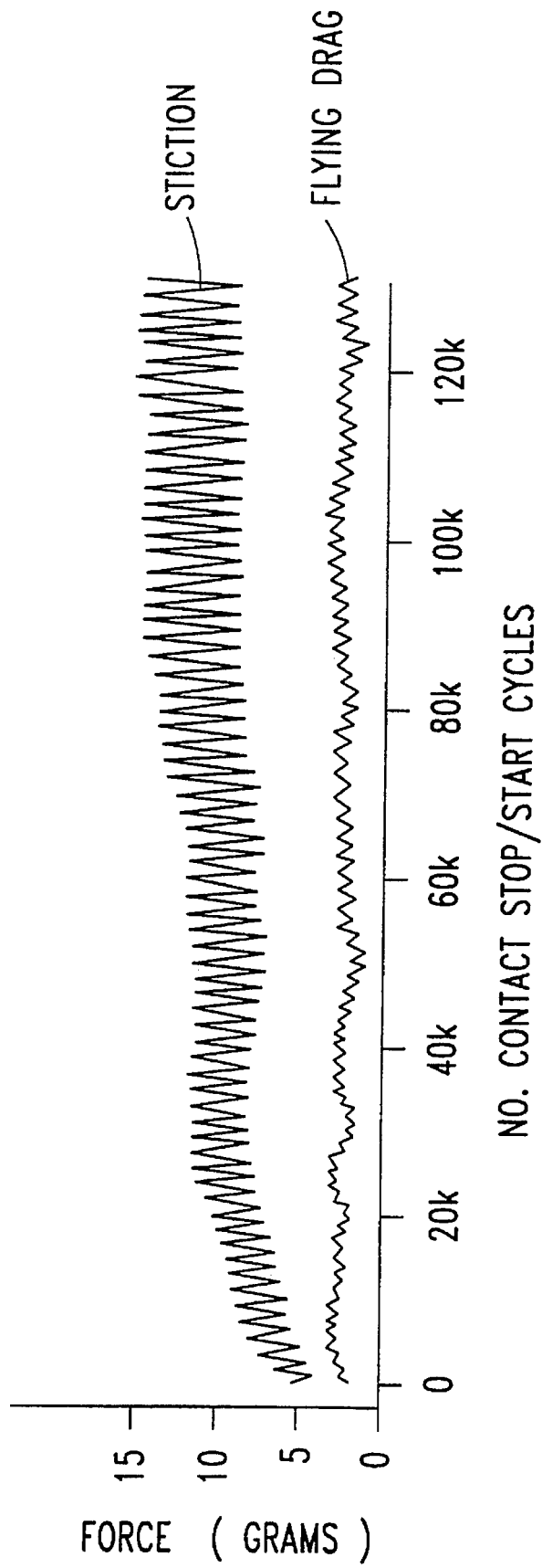
FIG. 3 is a plot of the number of contact start stop cycles vs. the force applied to a prior art slider.
Figure 4A:
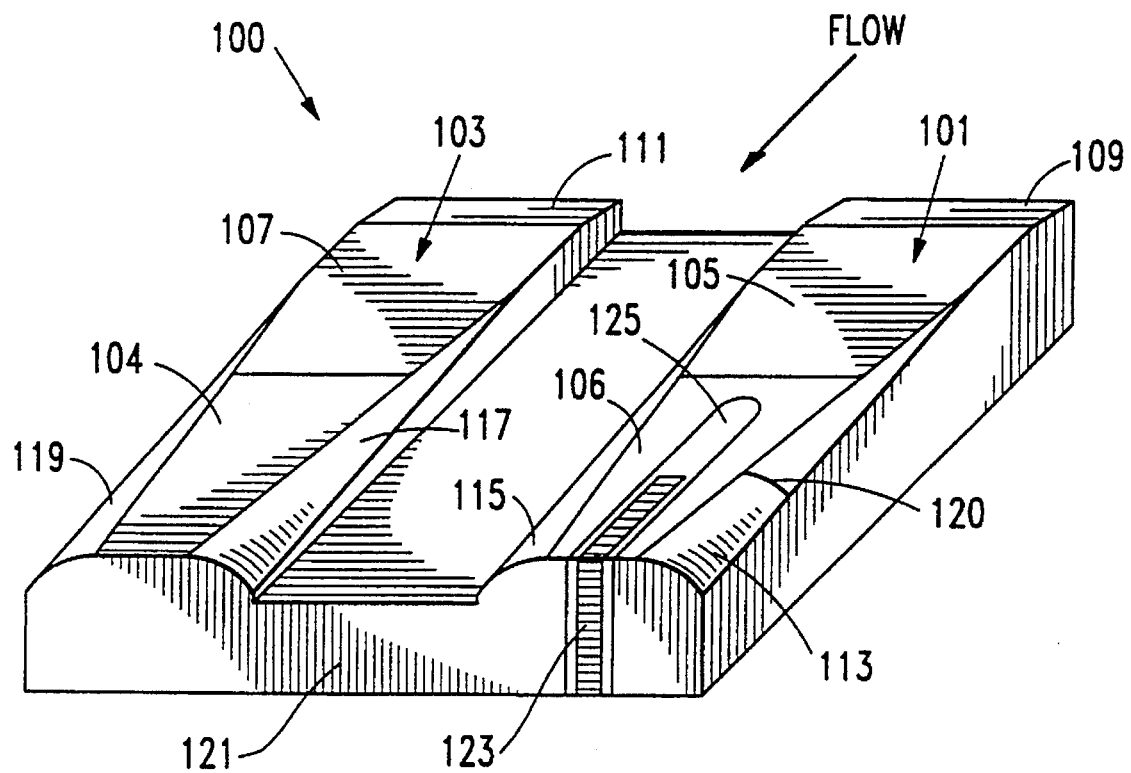
FIG. 4a is a perspective view of a slider in accordance with of the present invention.
Figure 4B:
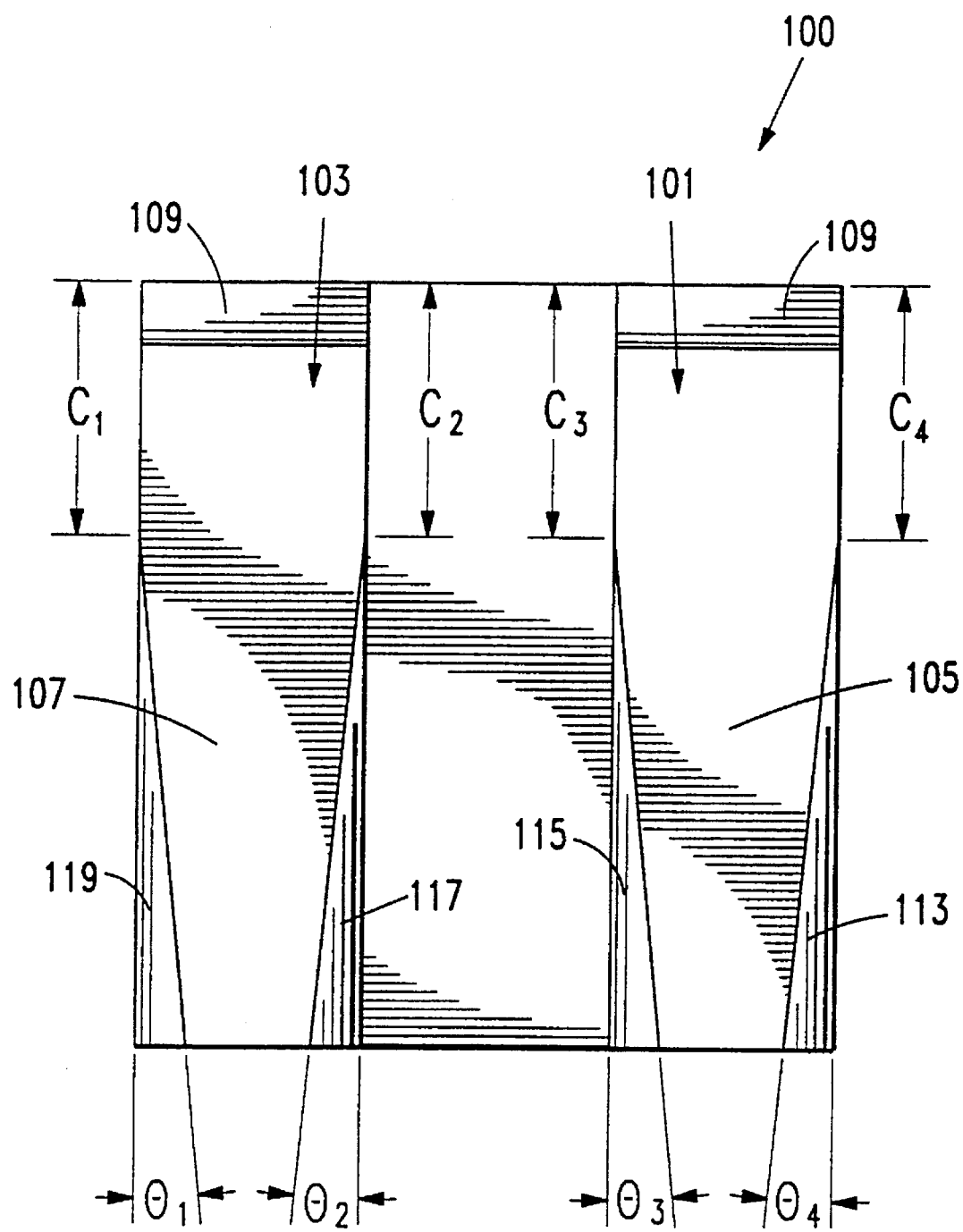
FIG. 4b is a bottom plan view of the preferred embodiment of the present invention.
Figure 5A:
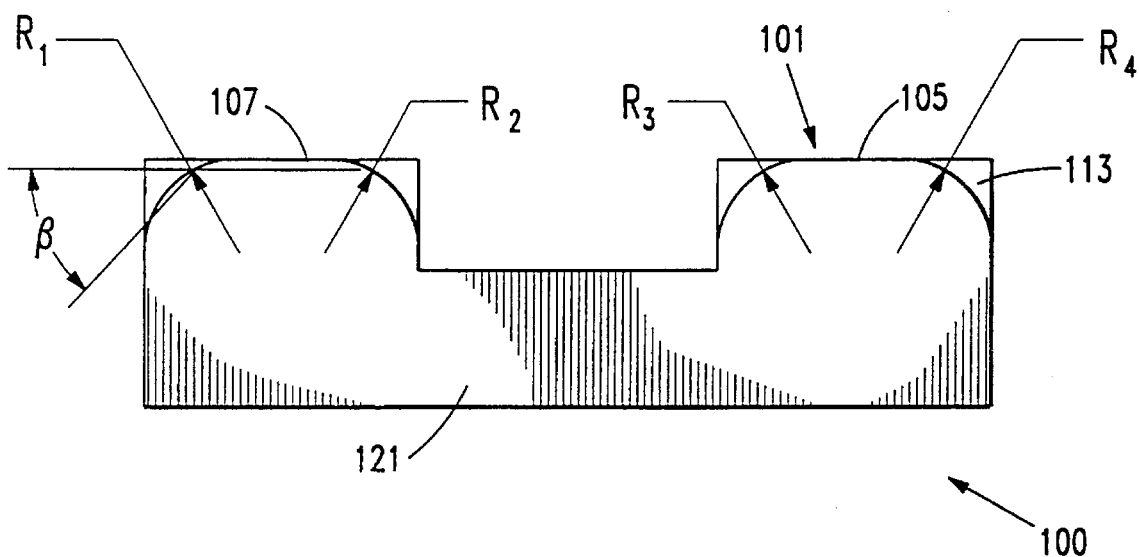
FIG. 5a is an end plan view of the preferred embodiment of the present invention.

FIG. 4a is a prospective view of a contact recording slider 100 in accordance with one embodiment of the present invention. FIG. 4b is a bottom plan view of the contact slider in accordance with one embodiment of the present invention. FIG. 5a is an end plan view of the preferred embodiment of the present invention. In accordance with the preferred embodiment, the contact recording slider has two rails 101, 103 which project above a slider body 121. An air bearing surface (ABS) 105, 107 makes contact with a magnetic recording medium (not shown) when the slider 100 is at rest. A leading edge taper 109, 111 at the leading edge of each ABS 105, 107 is shown. Each ABS 105, 107 extends toward the trailing edge of the associated rail 101, 103. The length of each ABS is determined by the angle of the longitudinal axis of the slider with respect to the plane of the recording medium during operation. Accordingly, the length of the ABS 105 depends on the length and width of the leading edge taper 109, and the width of the ABS 105. An active contact surface (ACS) 104, 106 is disposed on each rail and makes contact with the surface of the recording medium and asperities which project therefrom. The ACS includes the surface of each rail at all points which come into contact with asperities which project from the recording medium during operation. A recording element 123 is disposed within a slot 125 preferably at the trailing edge of one of an ACS 106.

In the embodiment illustrated in FIG. 4b, the ACS includes ACS contours 113, 115, 117, 119. As shown in FIG. 4b, one ACS contour 119 starts a distance $C_1$ from the leading edge of the rail 103. Likewise each of the other ACS contours 113, 115, 117 begin at distances $C_2$, $C_3$, $C_4$ each of which may be independently determined. In the preferred embodiment of the present invention, the range of values for $C_1$ through $C_4$ is between 0 and 60% of the length of the rail, i.e., of the distance between the leading edge and the trailing edge of the slider 100. In one embodiment, for a "50% slider" whereby the length of the rail is approximately 0.085 inches, the values of $C_1$–$C_4$ are between 0.030 and 0.050 inches.

Figure 6:
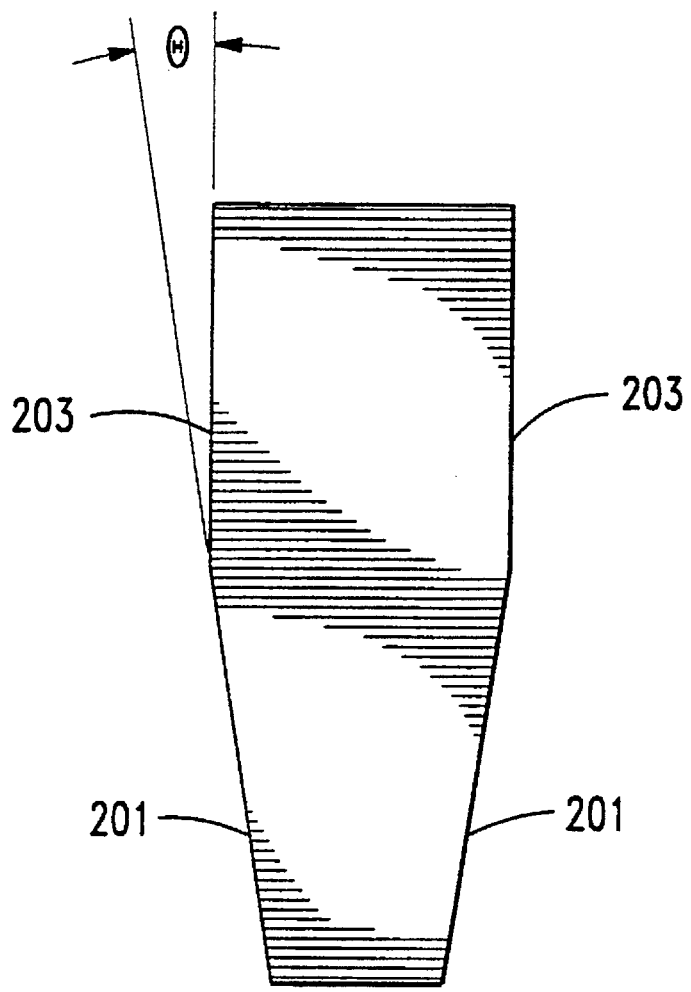
FIG. 6 is an illustration of the footprint of an air bearing surface in accordance with the preferred embodiment of the present invention.

FIG. 6 is an illustration of the footprint of an ABS 105, 107 in accordance with the embodiment of the present invention illustrated in FIGS. 4a–4b. A lateral ACS contour edge 201 forms an ACS slant angle $\Theta$ with a lateral rail edge 203. As best seen in FIG. 4b, four such angles $\Theta_1$–$\Theta_4$ are provided in the preferred embodiment of the present invention. Each ACS slant angle $\Theta_1$–$\Theta_4$ may be different. In the preferred embodiment of the present invention, the values of the angles are between 2 degrees and 10 degrees.

In the preferred embodiment of the present invention, the slider 100 is fabricated from conventional materials, such as non-magnetic ferrite or calcium titenate. As can best be seen in FIG. 4a, each ACS contour 113, 115, 117, 119 is blended in known fashion to acheive an asperity inlet angle and an asperity lifting distance which may each be determined independently. In the preferred embodiment of the present invention, the range of values of the inlet angles of each ACS contour 113, 115, 117, 119 are from 0.01–0.50 degrees. Preferably, the rate of change of the length of the arc 120 (see FIG. 4a) of the blend with respect to the distance along the rail from leading edge to trailing edge defines the ACS slant angle, and the surface contour of the ACS contour 113, 115, 117, 119. In the preferred embodiment, the rate of change of the length of the arc of the blend is constant with respect to the distance along the length of the slider 100 for each ACS contour 113, 115, 117, 119. Accordingly, each lateral ACS contour edge 201 is a formed as a straight line. However, in an alternative embodiment, this rate of change may vary along one ACS contour 113, 115, 117, 119, and/or from one ACS contour to another. Accordingly, each ACS contour 113, 115, 117, 119 may be uniquely shaped such that each lateral ACS contour edge 201 is a complex curve. However, even in such a case, it is preferable that the rate of change be positive such that the lateral ACS contour edge 201 is generally convex.

Figure 5B:
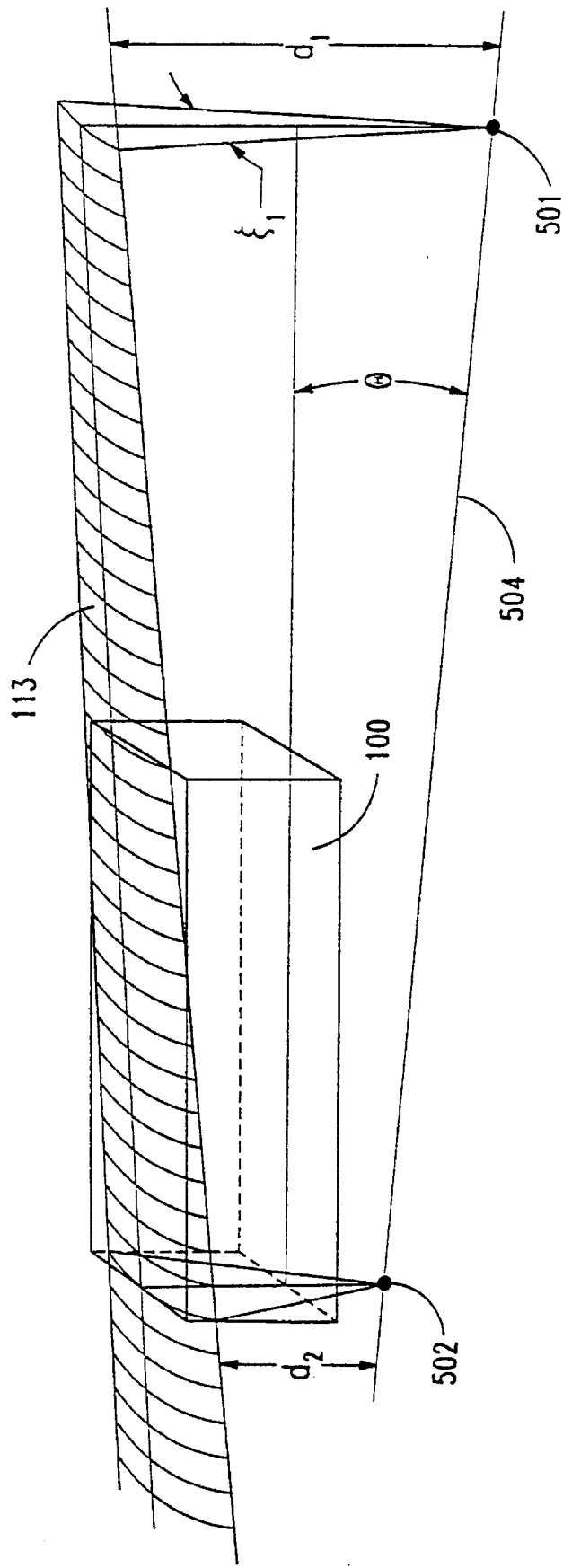
FIG. 5b is an illustration of one method for defining an active contact surface contour in accordance with the present invention.
Figure 5C:
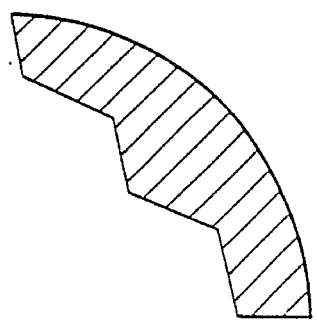
FIGS. 5c–5i illustrate alternative embodiments of an active contact surface contour in accordance with the present invention.
Figure 5D:
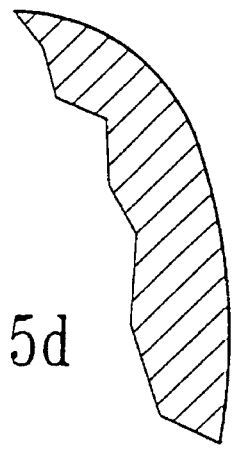
Figure 5E:
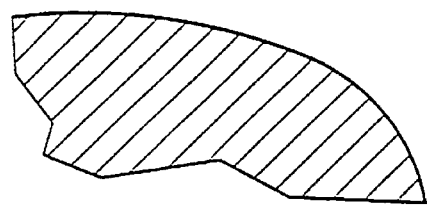
Figure 5F:
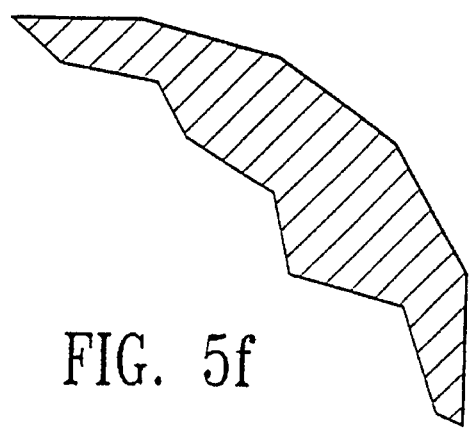
Figure 5G:
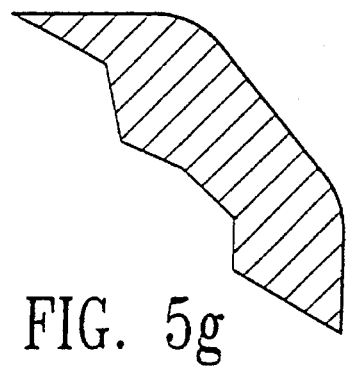
Figure 5H:
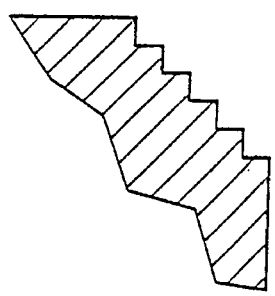
Figure 5I:
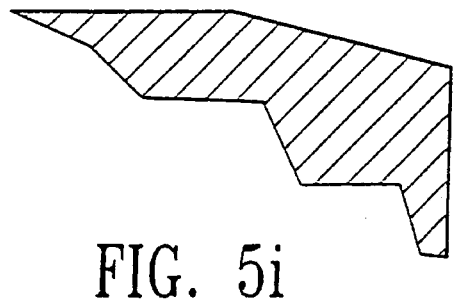

As shown in FIG. 5b, each surface of each ACS contour 113, 115, 117, 119 may also be defined by a first and a second point in space 501, 502 defining a line 504 at an angle $\Theta_7$ with the longitudinal axis of the slider 100. A radius of length that preferably varies continuously from a first length $d_1$ to a second length $d_2$ as a function of the distance of origin of the radius from the first point 501, is rotated about the line 504 to define the surface of an ACS contour 113, 115, 117, 119. In the preferred embodiment, the relationship between the distance of the origin and the length of the radius is linear. However, in alternative embodiments the relationship may be non-linear, non-monotonic, and/or discontinuous. Additionally, the length of the radius may vary as a function of the angle of rotation about the line 504. Thus, a cross section along the arc 120 (see FIG. 4a) taken at any point along the surface of each ACS contour 113, 115, 117, 119 may be a smooth curve of constant radius, as shown in FIG. 5c; smooth curve having a radius that varies as a function of the angle of rotation, as shown in FIGS. 5d and 5e; a series of straight lines connected end to end, as shown in FIG. 5f; a pair of arcs connected by a straight line, as shown in FIG. 5g; a stair step configuration, as shown in FIG. 5h; a single tapered edge, as shown in FIG. 5i; or any other contour. The contour is preferably such that an asperity moves generally smoothly over the surface of the ACS contour 113, 115, 117, 119 over a "lifting distance" $L_d$, such that the ratio of the lift distance to the maximum height of an asperity is greater than approximately 100:1. The lifting distance is defined as the distance traversed by an asperity along a path on the surface of an ACS contour 113, 115, 117, 119 as the ACS is lifted by the asperity. The asperity inlet angle $\beta$ is defined as the angle with respect to the plane of the recording medium surface of the tangent to the surface of the ACS 104, 106 oriented orthogonal to the longitudinal axis of the slider 100 as shown in FIG. 5a. The asperity inlet angle is preferably between approximately 0.01 and 0.5 degrees.

Figure 5J:
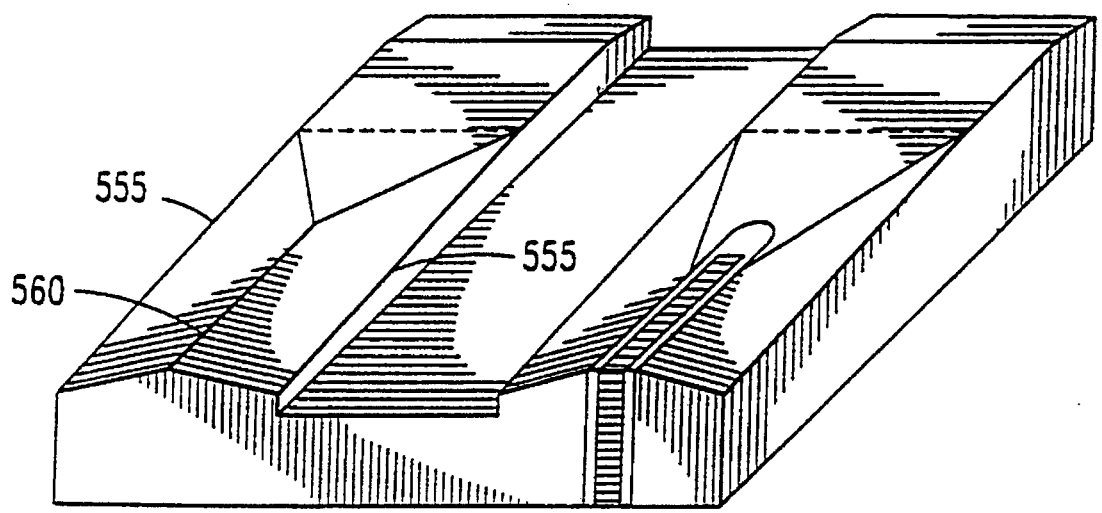
FIG. 5j illustrates another embodiment of the present invention in which the ACS contours are generally flat.
Figure 5K:
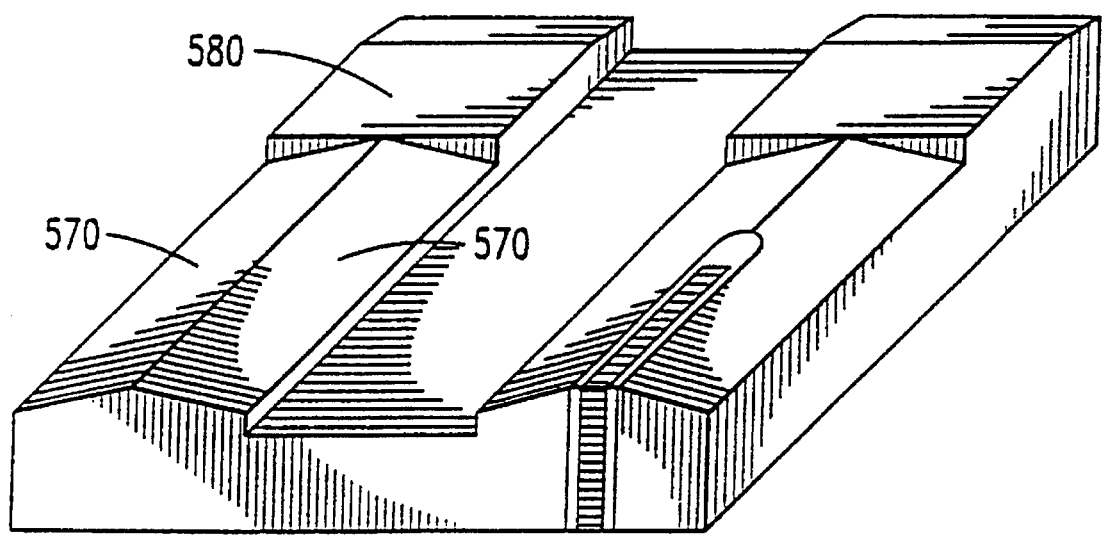
FIG. 5k illustrates an embodiment of the present invention which has symmetrical ACS contours which lie on planes which are distinct from the plane of the ABS.

FIG. 5j illustrates another embodiment of the present invention in which the ACS contours are generally flat, preferably with edge bevels 555, and a centerline 560 which is offset from the center of the rail and non parallel with the center of the rail. FIG. 5k illustrates an embodiment which has symetrical ACS contours 570 which lie on planes which are distinct from the plane of the ABS 580.

OPERATION OF THE PRESENT INVENTION

The present invention operates to minimize damage to both the slider 100 and the recording medium over which the slider 100 travels, while maintaining a portion of the slider 100 carrying the recording element 123 essentially in constant contact with the recording medium.

Figure 7A:
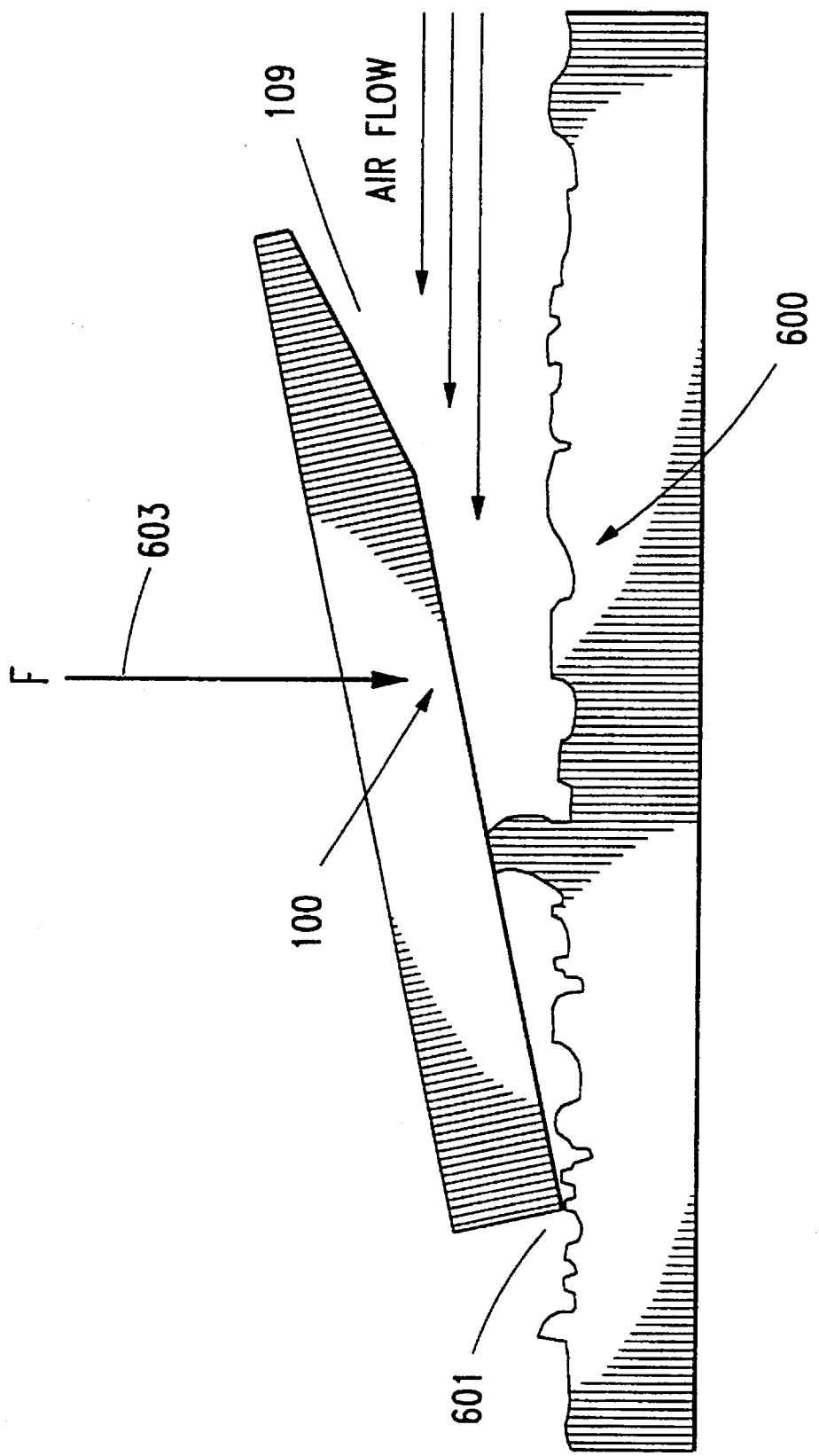
FIG. 7a illustrates a side view of a slider in operation over a recording medium.
Figure 7B:
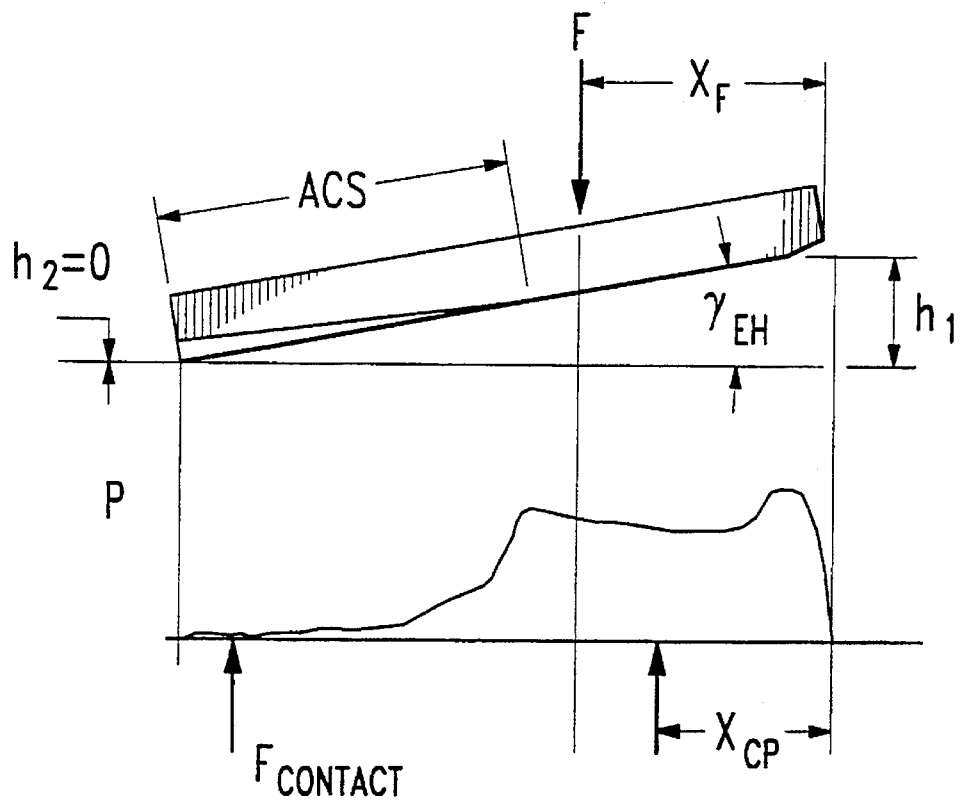
FIG. 7b illustrates the pressure distribution of a slider in accordance with the present invention.
Figure 8A:
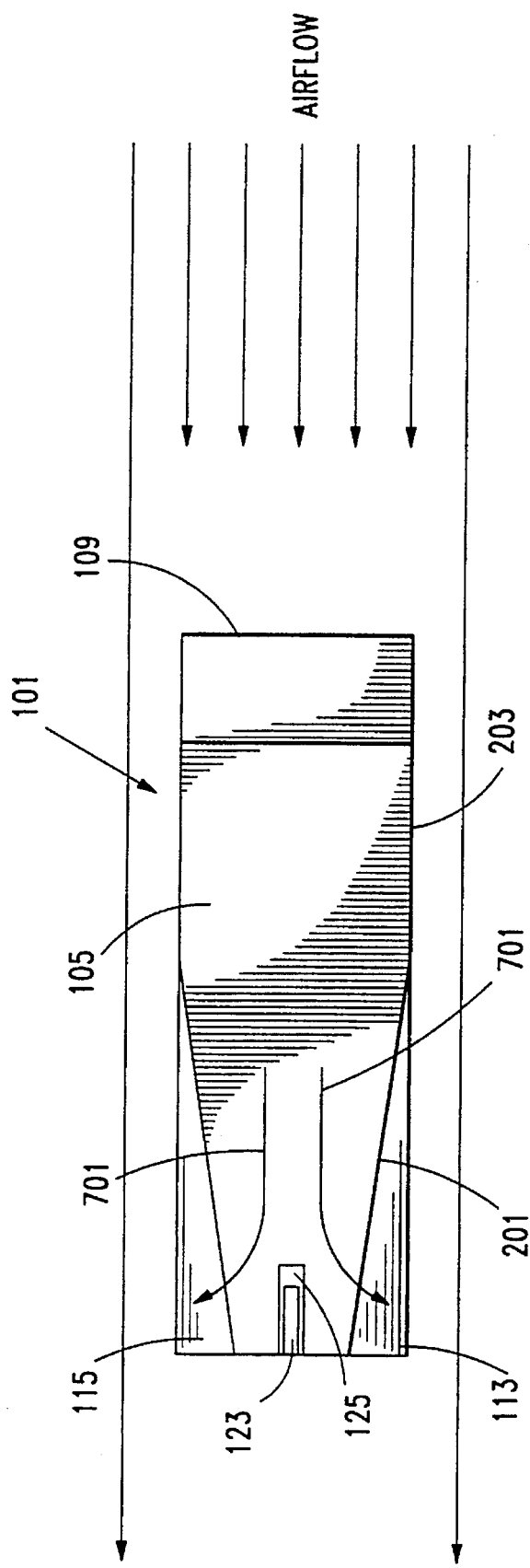
FIG. 8a illustrates the direction of air flow across the air bearing surface of a rail with the skew angle of 0°.

FIG. 7a illustrates a side view of a slider 100 in operation over a recording medium 600. FIG. 7b illustrates the pressure distribution of a slider 100 in accordance with the present invention. As shown in FIG. 7a, each ABS is raised above the recording medium 600 by an air bearing. Each ACS is in contact with the recording medium 600 during operation of the present invention. FIG. 8a illustrates the direction of air flow across the ABS of a rail 101 with the skew angle of 0°. As shown by arrows 701, air bleeds off at each ACS 104, 106 due to the ACS contours 113, 115, 117, 119. Thus, each ACS 104, 106 remains in contact with the recording medium 600, as shown in FIG. 7a, without excessive loading of the trailing portion of the slider 100. Providing ACS contours 113, 115, 117, 119 allows the load point 603 of a slider 100 in accordance with the present invention to be located near the leading edge of the slider 100. The load point 603 of the slider 100 is the point at which a force ("F") normal to the plane of the recording medium 600 is generally applied to the slider 100. Locating the load point 603 near the leading edge of the slider 100 provides improved interaction with asperities, as is discussed in greater detail below. In accordance with the present invention, a downward force F normal to the plane of the recording medium 600 is applied to the slider by a load beam assembly coupled at a point to an actuating arm. The slider 100 is preferably gimbled about a single point of attachment between the load beam assembly and the slider 100. Therefore, the load force F is essentially applied to the slider 100 at a single point on the slider 100.

The Table in FIG. 7b entitled "INVENTION" explains some of the characteristics of the contact slider illustrated in FIG. 7b. As in FIG. 7a, "F" indicates the load point 603 on the slider. "$X_F$" is the distance from the leading edge of the slider to the load point. "$L_R$" is the overall length of the slider rail, measured from the leading edge, and, as shown in the Table, $X_F$ is 5–49% of $L_R$. "$X_{CP}$" indicates the location of a center of pressure of the ABS. $X_{CP}$ is also 5–49% of $L_R$. The Table also shows that $X_F/X_{CP}$=1.05–1.20. As is also shown in FIG. 7b and the accompanying Table, the angle of tilt of the slider, $\gamma_{F,H}$, is between 0.003 and 0.006 degrees.

Figure 8B:
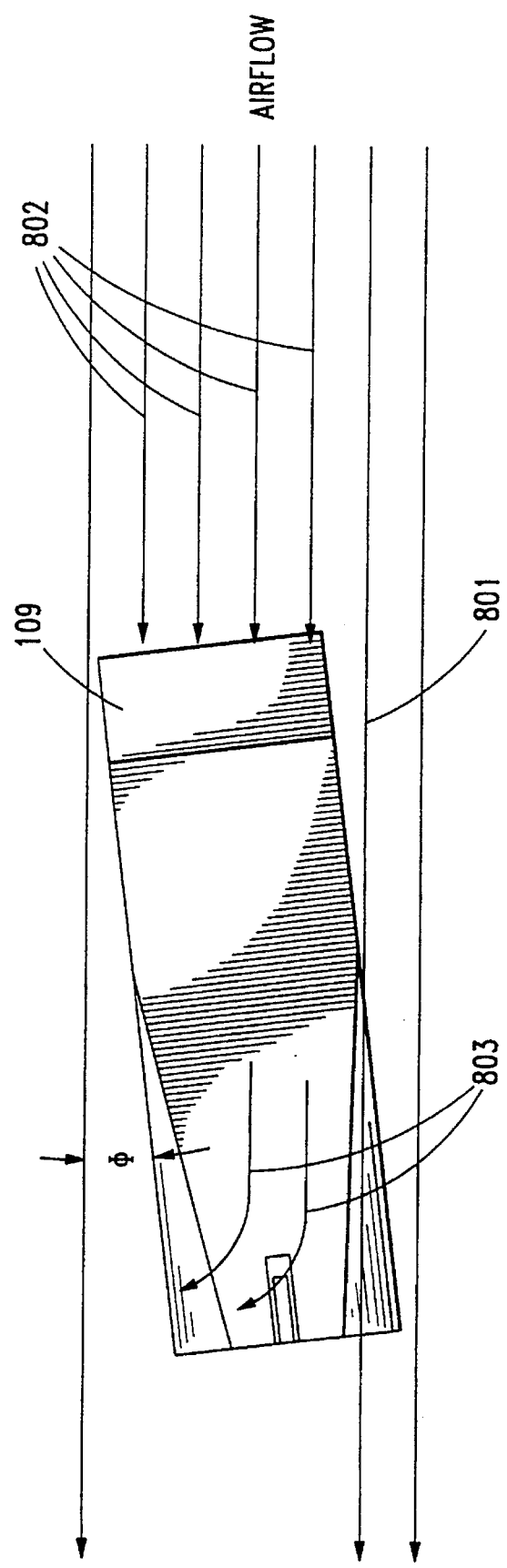
FIG. 8b illustrates a rail in accordance with the present invention at a skew angle equal to the ACS slant angle of a taper in accordance with the present invention.

FIG. 8b illustrates a rail 101 in accordance with the present invention at a skew angle φ. FIG. 8b illustrates that at angles less than φ only a very small portion of the air flow is transverse with respect to each rail 101. That is, nearly all of the air either flows past the ABS as shown by arrow 801, or encounters the leading edge taper 109 as shown by arrows 802. During operation at a skew angle other than 0°, air bleeds off as shown by arrows 803 in FIG. 8b. Thus, even at skew angles, the ACS contours 113, 115 allow the ACS to remain essentially in contact with the recording medium 600. Therefore, the affect of skew angle on the operation of the recording element is virtually eliminated.

By maintaining contact between the ACS and the recording medium 600 regardless of the skew angle of the slider 100, the present invention allows a higher flux density to be imposed upon the recording medium, and thus information to be densely packed on the recording medium 600. For example, approximately 1000 megabytes of data may be stored on a conventional 3.5" disk drive equipped with a slider in accordance with the present invention, whereas the prior art is currently capable of storing approximately 420 megabytes. Furthermore, since the ACS remains essentially in contact with the recording medium 600 regardless of the skew angle of the slider 100, the density of information recorded is constant.

A further advantage of the present invention is the manner in which the present invention interacts with asperities (i.e., protrusions and protuberances which rise above the glide height, or mean, burnished asperity height of the surface of the recording medium 600). The interaction of the present invention with asperities is less likely to cause damage than such interaction would when a prior art slider is being used due to: (1) the existence of the ACS contours 113, 115, 117, 119 of the present invention, (2) the inventive positioning of the load point with respect to the slider 100.

Because the present invention is operated with each ACS (which contains the recording element 123) essentially in contact with the recording medium 600, the leading edge of the ABS may be operated at a relatively great distance above the recording medium without affecting the flux density (i.e., the density of the information) that may be recorded on the recording medium 600. Accordingly, it is more likely that the leading edge of the slider 100 will not strike asperities as it's flying height is above the maximum asperity height of the medium. In the preferred embodiment, the leading edge of the slider 100 is operated approximately 7 microinches (for a 50% slider) above the recording medium, whereas typical asperities are on the order of 2–5 microinches maximum. Furthermore, locating the load point forward of the mid point of the slider 100 (i.e., nearer the leading edge of the slider than the trailing edge) reduces the force of impact produced by asperities striking the ABS of the slider 100. In accordance with the preferred embodiment of the present invention, the load point is forward of the mid-point between the leading and trailing edge of the slider 100, as illustrated by arrow 603 in FIG. 7a. Since the forward portion of the slider 100 will typically be above the top of the asperity, the slider 100 will contact the asperity at a point behind the load point. Accordingly, the initial point of contact between the aperity and the slider 100 will be lightly loaded and the slider 100 will more easily comply with the motion required for the slider 100 to ride over the asperity.

Providing ACS contours 113, 115, 117, 119 prevents transverse contact with asperities unless the slider 100 is at a skew angle that is greater than the ACS slant angle $\Theta_1$–$\Theta_4$ of the particular ACS 104, 106 on the generally forward facing side of a rail 101, 103. In the preferred embodiment of the present invention, the lateral ACS contour edge 201 is preferably blended to a convex shape as best illustrated in FIGS. 4a, 4b. Such blending provides a greater distance for an asperity to travel along the surface of the slider during transverse contact between the slider 100 and the asperity (i.e., increases the lifting distance). This, in turn, disperses and reduces the inertia forces exerted by the slider 100 on the asperity, and reduces the rate of vertical acceleration of the slider 100. The dispersion and reduction in force increases the life of the recording medium. Also, the frequency of any oscillations which result from the impact are reduced. Accordingly, any damage to either the slider 100 or the recording medium is reduced. The precise characteristics of the curvature of the blend may vary as noted above with respect to FIGS. 5a–5i. In the preferred embodiment of the present invention illustrated in FIG. 5g, the radius of the smoothing blend connecting the asperity inlet surface may be independently defined. In the preferred embodiment of the present invention, the values of the blends are approximately 0.1 to 1.0 mil.

Figure 9:
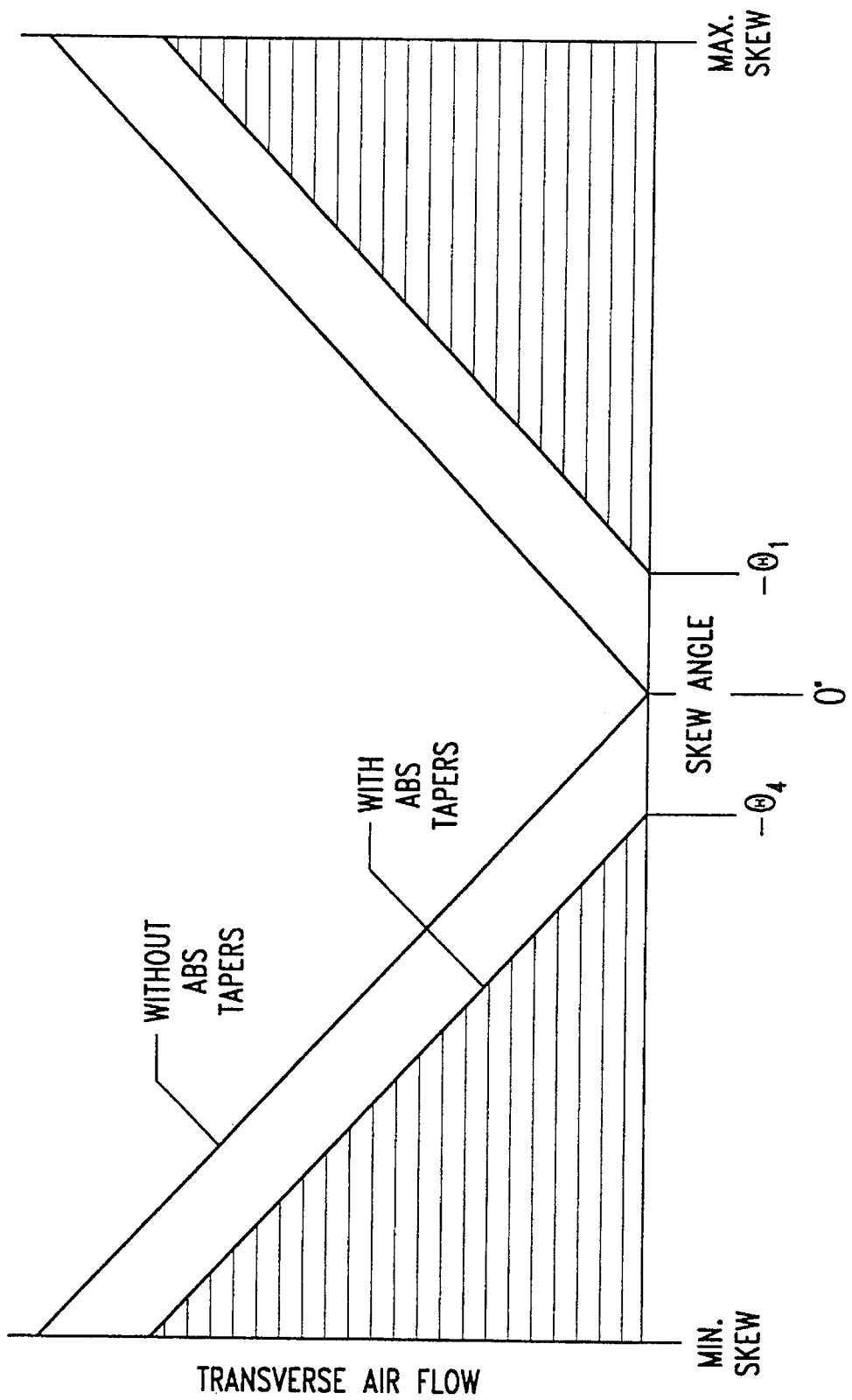
FIG. 9 is a graph of the amount of transverse air flow encountered by a slider having air bearing surface tapers in accordance with the present invention at various skew angles in contrast with the amount of transverse air flow encountered by a slider without air bearing surface tapers.

FIG. 9 is a graph of the amount of transverse air flow encountered by a slider 100 having ACS contours 113, 115, 117, 119 in accordance with the present invention at various skew angles in contrast with the amount of transverse air flow encountered by a slider without ACS contours. The graph is presented without dimensions and is only intended to illustrate the fact that having ACS contours 113, 115, 117, 119 reduce the amount of transverse air flowing under the rail at a given skew angle. At 0° skew angle, there is no transverse air flow in either the slider with ACS contours or the slider without ACS contours. Between skew angles $\Theta_1$ and minus $\Theta_4$, the slider 100 with ABS tapers encounters minimal transverse air flow. However, in contrast, a slider which does not have ABS tapers encounters a substantial increase in the transverse air flow. The amount of transverse air flow encountered by the slider 100 having ACS contours begins to increase as the skew angle exceeds the range of angles from $\Theta_1$ to minus $\Theta_4$. However, the benefit that is achieved by having ACS contours 113, 115, 117, 119 is maintained even at skew angles outside the range of $\Theta_1$ to $\Theta_4$.

Figure 10A:
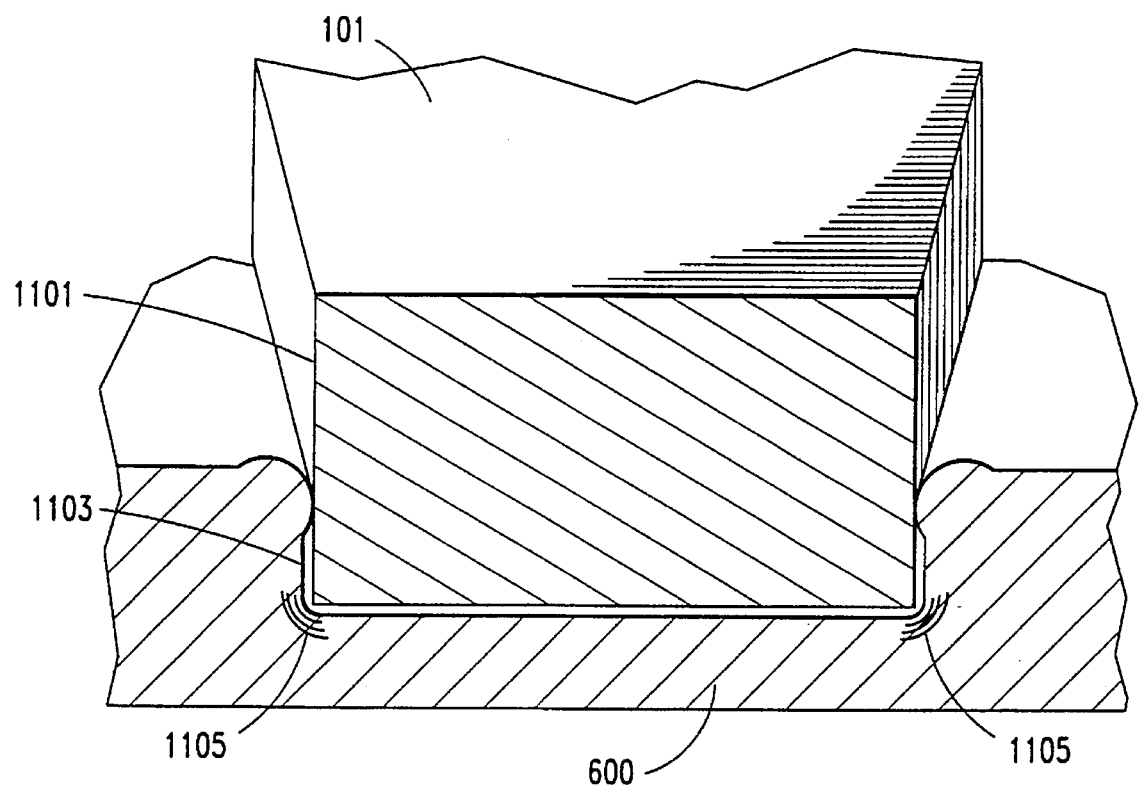
FIG. 10a illustrates a cross-section of a rail of a slider in accordance with the present invention at rest upon a recording medium.
Figure 10B:
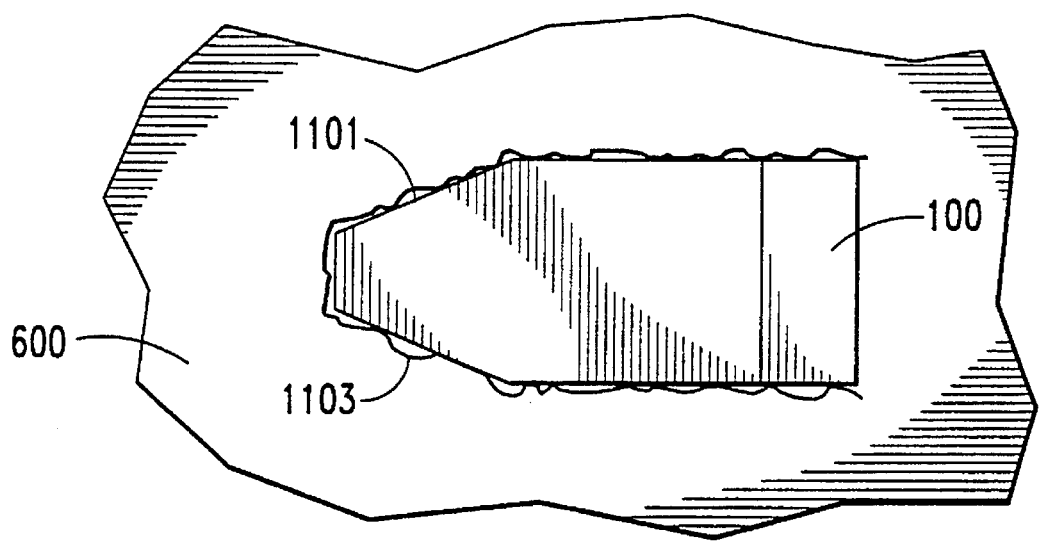
FIG. 10b illustrates a top view of a slider in accordance with the present invention at rest upon a recording medium.
Figure 10C:
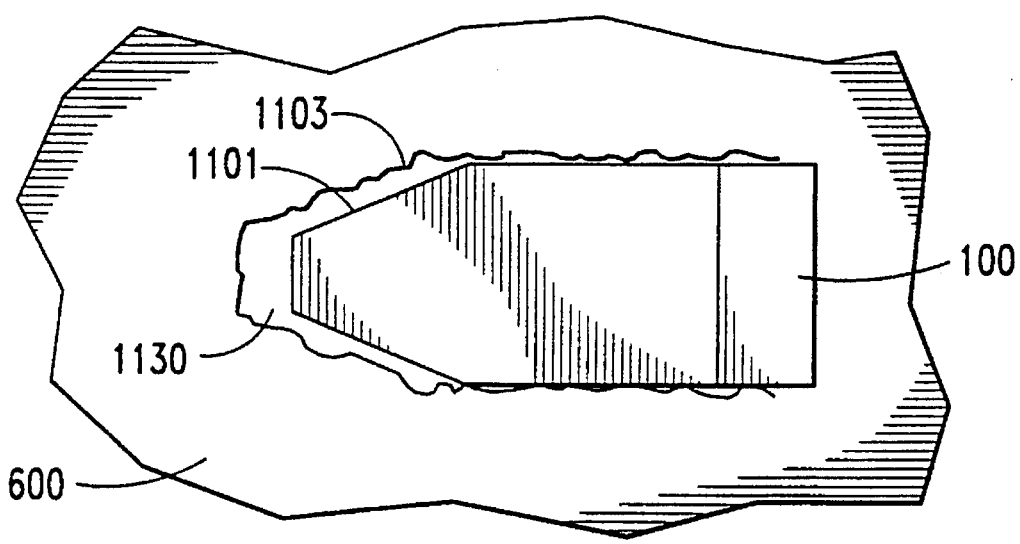
FIG. 10c illustrates a top view of a slider in accordance with the present invention immediately after the slider is placed in motion.
Figure 11:
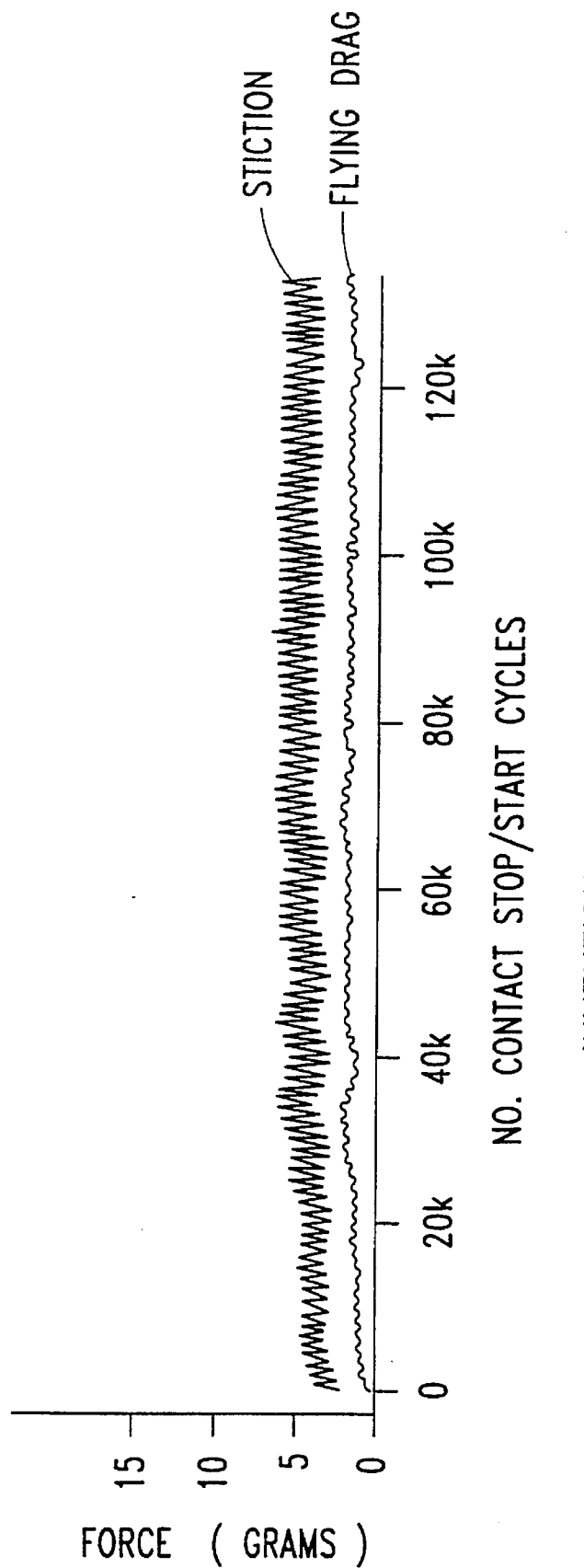
FIG. 11 is a plot of the number of contact start stop cycles vs. the force applied on the slider of the present invention.

A further advantage of the present invention which derives from the ACS contours 113, 115, 117, 119 is a reduction in stiction (i.e., the force which causes bodies at rest to adhere to one another). One of the factors that causes stiction between a first body and a second body is the first body, such as a slider, resting on the second body, such as a recording medium, in a manner which causes the first body to depress in the second body. FIG. 10a illustrates a cross-section of a rail 101 of a slider 100 at rest upon a recording medium 600. FIG. 10b is a top view of the slider 100 on the medium 600. The depression shown in the figure is exaggerated for clarity. Stress lines 1105 are shown which indicate the fact that high stress is exerted at the lower corners of the depression. As the rail 101 attempts to move with respect to the recording medium 600, a shearing force is generated between the side 1101 of the rail 101 and an inner wall 1103 of the depression. In accordance with the preferred embodiment of the present invention, as a consequence of the ACS contours 113, 115, 117, 119 provided on each rail 101, 103, the side 1101 of the rail moves away from the inner wall 1103 of the depression, causing a gap 1130 to open between the side 1101 and the wall 1103. Thus, instead of the side 1101 shearing against the wall 1103, the side 1101 essentially pulls cleanly away from the the wall 1103. Experimentation has shown that the present invention improves contact start-stop by over 300%. FIG. 11 is a plot of the number of contact start stop cycles verses the force exerted on the slider 100 of the present invention.

ALTERNATIVE STRUCTURES

FIGS. 12a–12c and FIGS. 13a–13c illustrate four alternative embodiments of the present invention. Only a single rail in a typically tow rail slider is shown for illustrative purposes. In accordance with the embodiment illustrated in FIG. 12a, the rail 1001 has a step or knotch which forms at least one surface 1003 that is preferably generally parallel to the plane of the ABS 1005. Lateral walls 1002 are shown to be generally at right angles to the ABS 1005 and ACS 1006, but may be formed at other angles without departing from the scope of the present invention. Furthermore, the lateral ACS contour edges 1004 may be blended to reduce the sharp contour at the edges 1004. Accordingly, the edges 1004 may be provided with a small radius of curvature.

Figure 12A:
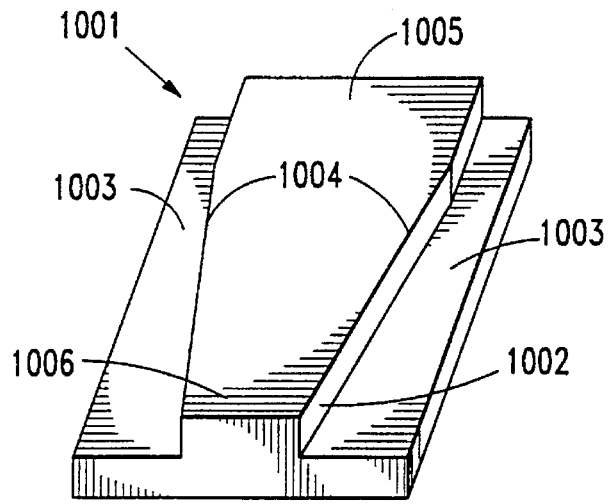
FIG. 12a–12c illustrate three alternative embodiments of rails of sliders in accordance with the present invention.
Figure 12B:
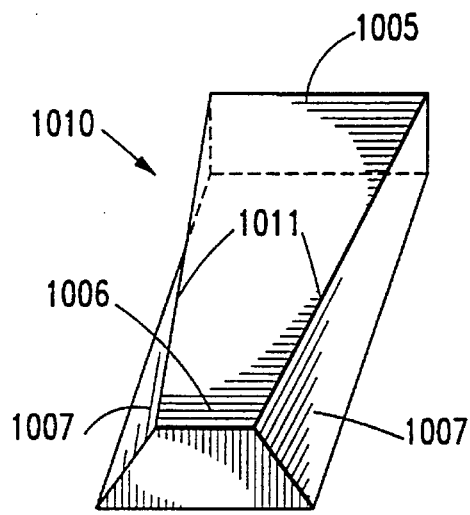

In accordance with the embodiment of FIG. 12b, the angle of a wall 1007 varies with respect to the plane of the ABS 1005 and ACS 1006 from approximately 90° at the leading edge of the ABS 1005 to approximately 45° at the trailing edge of the ACS 1006. The lateral ACS contour edges 1011 may be blended to a uniform depth along each edge to a generally convex shape to reduce the shape contour at the edges 1011.

Figure 12C:
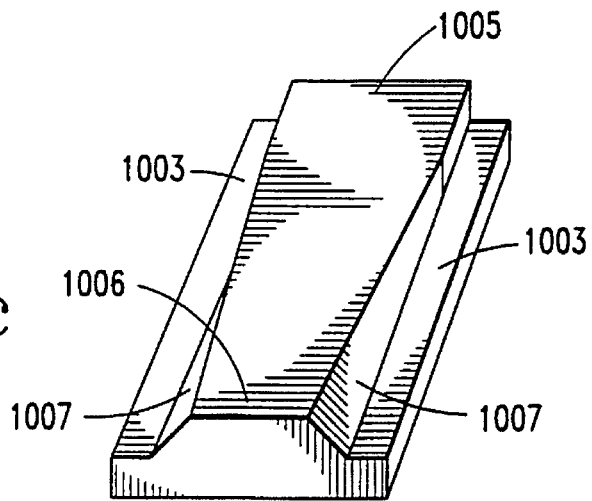

In accordance with the embodiment illustrated in FIG. 12c, a surface 1003 is provided generally parallel to the plane of the ABS 1005 and the ACS 1006, in similar fashion to the embodiment illustrated in FIG. 12a. However, the wall 1007 varies in its angular relationship to the plane of the ABS 1005 and the ACS 1006 as a function of the distance from the trailing edge of the ACS 1006.

Figure 13A:
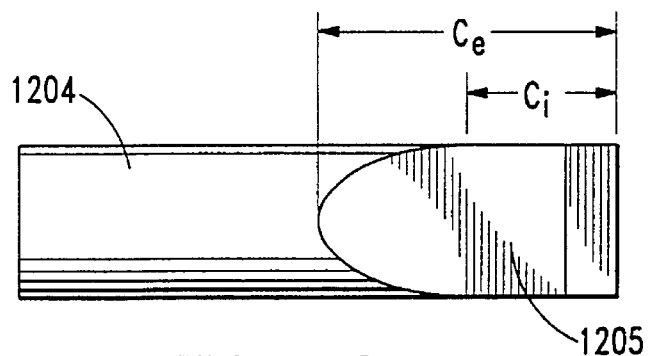
FIGS. 13a–13c illustrate another alternative embodiment of the present invention.
Figure 13B:
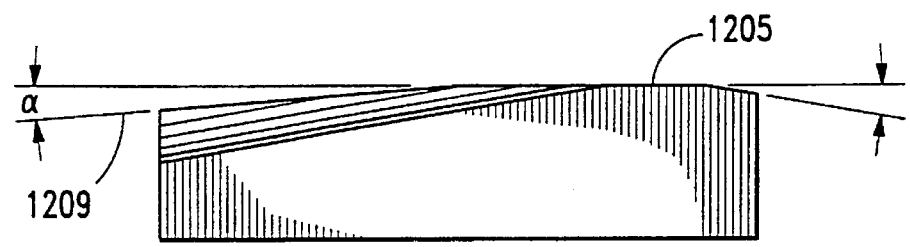
Figure 13C:
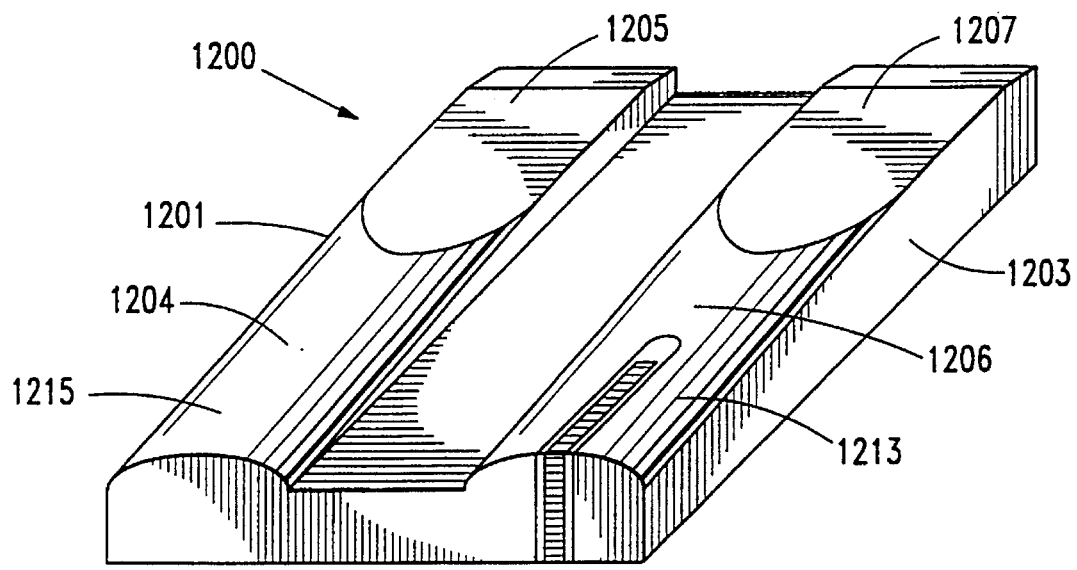

In accordance with FIG. 13a–13c, one ACS contour 1213, 1215 is provided on each rail 1201, 1203 of the slider 1200. A line 1209 coincident with the crest of each ACS contour 1213, 1215 is at an angle a with respect to a plane of an ABS 1205, 1207 provided on the same rail as the ACS contour 1213, 1215. As is the case with respect to the embodiment of the present invention illustrated in FIG. 4a, each ACS 1204, 1206 includes a portion of an associated ACS contour 1213, 1215 which is subject to contact with the medium during normal operation, as well as the portion of the surface of the associated rail 1201, 1203 which is coplanar to each ABS 1205, 1207 and subject to contact with the surface of the recording medium.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

I claim:

1. A contact slider for supporting a transducer for performing read and write operations on a recording medium, the contact slider having a leading edge and a trailing edge, the contact slider including:
   a. a slider body having at least one rail projecting from the slider body, each rail including:
      i. an air bearing surface (ABS) having a center of pressure; and
      ii. an active contact surface (ACS) for contacting a recording medium during read and write operations, the ACS being disposed rearward of the ABS, such that, during read and write operations, the leading edge of the contact slider is generally disposed above the recording medium and the trailing edge of the contact slider remains in substantially continuous contact with the recording medium;
   b. a load point disposed forward of a mid point of the contact slider and rearward of the ABS center of pressure.

2. The contact slider of claim 1, further including a recording element disposed on at least one rail.

3. The contact slider of claim 1, wherein the ACS has at least one lateral ACS contour edge, the lateral ACS contour edge being blended to a generally convex shape with respect to a longitudinal axis of the rail on which the ACS is included.

4. The contact slider of claim 3, wherein the blended ACS contour edge has an arc having a length, and wherein the rate of change of the length of the arc of the blended lateral ACS contour edge with respect to distance along the lateral ACS contour edge defines an ACS slant angle.

5. The contact slider of claim 4, wherein the rate of change of the ACS slant angle is constant.

6. A contact slider for supporting a transducer for performing read and write operations on a recording medium, the contact slider including:

a. two rails, each having an air bearing surface (ABS), the ABS having a center of pressure, and an active contact surface (ACS), the ACS having a leading edge and a trailing edge, the trailing edge of each ACS being narrower than the leading edge of the ACS and in substantially continuous contact with a recording medium during read and write operations, the ABS being generally disposed above the recording medium during read and write operations; and b. a load point disposed forward of the mid point of the slider.

7. A contact slider for supporting a transducer for performing read and write operations on a recording medium, the contact slider having a leading edge and a trailing edge, the contact slider including:

a. at least one rail having:

i. a first surface disposed on a first plane;

ii. an air bearing surface (ABS) disposed on a second plane generally parallel to and spaced from the first plane, the ABS having a center of pressure; and iii. an active contact surface (ACS) disposed on the second plane and rearward of the ABS, the ACS having a leading edge and a trailing edge, and having a taper such that the trailing edge of the ACS is narrower than the leading edge of the ACS;

wherein the ACS is maintained in substantially continuous contact with the recording medium and the ABS is generally disposed above the recording medium during read and write operations; and b. a load point disposed forward of a midpoint of the contact slider and rearward of the ABS center of pressure.

8. A data storage device for storing and recovering information upon a magnetic medium including:

a. a magnetic recording medium sensitive to changes in magnetic flux for storing information during a write operation and for recovering information during a read operation; and b. a contact slider for supporting a transducer for substantially contacting the magnetic recording medium during read and write operations, the contact slider having a leading edge and a trailing edge, the contact slider including:

i. a slider body having at least one rail projecting from the slider body, each rail including:

(1) an air bearing surface (ABS) having a center of pressure; and (2) an active contact surface for contacting the recording medium during read and write operations, the ACS being disposed rearward of the ABS, such that the leading edge of the contact slider is generally disposed above the recording medium and the trailing edge of the contact slider remains in substantially continuous contact with the recording medium during read and write operations;

ii. a load point disposed forward of a mid point of the contact slider and rearward of the ABS center of pressure.

* * * * *